United States Patent Office 3,177,056
Patented Apr. 6, 1965

3,177,056
PROCESS FOR MAKING A POROUS ABRASIVE
BODY AND PRODUCT THEREOF
Hans Höfelmann, Wiesbaden-Biebrich, and Robert Braun,
Wiesbaden, Germany, assignors to Kalle Aktiengesellschaft, Wiesbaden-Biebrich, Germany, a corporation of
Germany
No Drawing. Filed Apr. 11, 1962, Ser. No. 186,622
Claims priority, application Germany, Mar. 5, 1959,
K 37,157
4 Claims. (Cl. 51—296)

The present invention is concerned with a process for making a porous abrasive body of organic material, in particular with sponge-like polyvinyl acetal bodies containing abrasives. The invention also includes the abrasive body obtained by this process.

It is known to make a sponge having an abrasive surface by beating air or another inert gas into an aqueous solution which contains polyvinyl alcohol, formaldehyde, an acid, an abrasive, and a froth-stabilizing wetting agent, pouring the foamed aqueous solution into a mold, allowing the molded foam to set, washing the foamed solid porous body, and drying it (U.S. Pat. No. 2,609,347, to Wilson).

In another know process for making a cellular article having abrasive particles uniformly distributed therein, an aqueous solution of polyvinyl alcohol is formed separately from a foamed mass which is prepared by mixing water with a surface active foaming agent and agitating same to form a stable foam. The foamed mass, abrasive particles and the aqueous solution of polyvinyl alcohol are then mixed to form a uniformly foamed mass, a catalyst is introduced into this foamed mass and then formaldehyde is uniformly mixed into it to cause gelation and solidification of the foamed mass. It is also known to modify the thermoplastic properties of the polyvinyl acetal body, which results from the chemical reaction occurring within the foamed solution between the polyvinyl alcohol and the formaldehyde when the foam sets, by incorporating into the polyvinyl acetal a thermosetting resin, such as phenol- or urea-formaldehyde resin.

The sponge-like polishing disks known to the art are, above all, unsatisfactory with regard to their resistance to abrasion and breaking. As their content (by volume) of abrasives is relatively low, they are not very effective and rapidly wear away.

Now a process has been found for making a porous abrasive body which, insofar as its elastic properties are concerned, is intermediate the polishing bodies of non-cellular plastic materials and those of foamed plastics. In the process according to the present invention, in which porous elastic shaped bodies for use as polishing material are prepared by transforming a polyvinyl alcohol into an acetal in the presence of an acid catalyst in a foamed aqueous solution, fine particles of a thermoplastic are present in the foamed aqueous solution, containing a dissolved polyvinyl alcohol, formaldehyde, an acid catalyst, and abrasive particles, when it is poured into a mold and allowed to solidify in known manner. The body thus obtained is washed with water to remove the acid and dried. If needed, the abrasive body may be given the shape intended for the finished polishing tool.

As a result of the presence of fine particles of a thermoplastic in the setting foam, the abrasives are embedded into a mixed binding material. When the setting reaction is completed, this mixed binder consists of a polyvinyl formal into which the thermoplastic particles are incorporated or to which they may even be fixed chemically. The capacity of these mixed binders for accepting and carrying abrasive particles is surprisingly high. This property is determined mainly by the quantity of the thermoplastic present other than polyvinyl formal, as the thermoplastic particles present in the setting foam have a contracting effect on the formed bodies during the drying operation, so that the finished porous products have great strength.

The thermoplastic materials, of which the thermoplastic particles to be present in the polyvinyl alcohol solutions are made, are added in the form of a dispersion. They must be compatible with the polyvinyl alcohol present in the solution.

Suitable materials to be added in a dispersed state are: polyvinyl esters and polyacrylic esters and copolymers thereof, polyvinyl ethers, polyisobutylene, polystyrene, polyvinyl chloride and polyvinylidene chloride and copolymers thereof, and copolymers of butadiene-styrene or butadiene-acrylonitrile. This enumeration is merely exemplary. All dispersions of thermoplastics are suitable which are sufficiently compatible with the other components of the solution.

The average grain size of the solids contained in the thermoplastic dispersions is in the range of about $0.01\mu$ to about $10\mu$. This high degree of dispersion not only causes an increase in the binding capacity of the organic substance, which permits a considerable reduction in the content of binders, but involves also a higher chemical reactivity of these substances.

Thermoplastic dispersed materials which are capable of reaction with formaldehyde as well as with polyvinyl alcohol, or which are capable of modifying, in chemical respects, another substance present in the reaction mixture, are preferably used. Polyvinyl esters, for instance, which are partially saponified, easily cross-link with polyvinyl alcohol by means of formaldehyde.

The thermoplastic properties of this new combined binding material allow greater quantities of abrasives to be included and thus favorably affect the grinding properties of the produced abrasive body.

It is a further advantage of the process according to the present invention that the porosity of the products can be broadly varied by changing the composition of the starting mixtures. It is possible to produce pores of a size which are many times that of the abrasive particles present. Moreover, the products of the present invention have the advantage, that due to the plasticity of the binding material, a coarse grain used in the polishing body according to the present invention has the same effect as a considerably finer grain when used with other polishing bodies. In the products of the present invention, the grain works more gently. This fact is of considerable advantage from the point of view of economy, because abrasives of a finer granulation are much more expensive.

The kind of bond formed, and hence, the hardness of the grinding and polishing tools prepared from the shaped bodies can be varietd within a wide range by selecting suitable proportions of the binder components used, i.e., polyvinyl alcohol and dispersed thermoplastics. The proportion of the first to the second may vary from about 0.9:1 to about 8:1, based on the weight of the dry polymers.

All types of polyvinyl alcohol, e.g., of low, medium, or high viscosity, in which the hydrolyzable groups are hydrolyzed to at least 80%, can be used in the process according to the present invention. Up to 20% of the hydroxy groups of the polyvinyl alcohols used in the process of this invention may already be transformed into acetals, provided that the partially acetalized polyvinyl alcohols remain water-soluble.

Copolymers and/or graft polymers of polyvinyl alcohol, if desired in admixture with polyvinyl alcohol, may also be used. Such substances are, for example, copolymers of a vinyl ester with another monomeric vinyl compound, which have been saponified, or a graft polymer obtained by hydroxyalkylation or cyanoethylation. The grinding and polishing tools prepared with these compositions are particularly advantageous.

In the process according to the present invention, at least 30 to 85 percent of the hydroxy groups are transformed into acetal groups or are otherwise chemically bonded at the end of the reaction of the formaldehyde present with the polyvinyl alcohol.

As a catalyst, especially for the reaction between the polyvinyl alcohol and formaldehyde to form the acetal, mineral acids are present in the reaction mixture, in concentrations ranging from about 2 to 70% by weight. The formaldehyde component is preferably added in the form of a 30–40% aqueous solution. Compounds which under the reaction conditions of this invention split off formaldehyde, e.g., a polymeric formaldehyde such as paraformaldehyde, may also be used in the process.

The expressions "abrasives" or "abrasive particles" as used in the present application are meant to designate the abrasive substances customarily used for the preparation of polishing and grinding agents and include more or less fine particles of such materials as: corundum, silicon carbide, boron carbide, emery, pumice, glass, quartz, tripoli, chalk, oxides of chromium, iron, cerium and beryllium, and diamonds. The grain size may be selected according to the purpose for which the finished article is to be used. Mixtures of different abrasives and different grain sizes may also be used. The content of abrasive can be higher than that hitherto attainable, i.e., to 300–2000 percent of the sum of polyvinylalcohol and dispersed thermoplastic, or higher. Thus, porous thermoplastic abrasive bodies containing at least as much abrasive particles as 300 percent by weight of the sum of polyvinyl formal and thermoplastic material, other than polyvinyl formal, up to 2000 percent by weight of the sum of binding material or higher, may be prepared.

For special effects, filling materials of other kinds may be added, in addition to the above materials, to the polyvinyl alcohol solutions to be foamed in the process of this invention, e.g., filling materials of fibrous structure, as natural or synthetic fibers.

The process of the present invention is illustrated by the following:

Formaldehyde is reacted with a polyvinyl alcohol in an aqueous solution of a thermoplastic material, in the presence of a mineral acid, the thermoplastic material having been added as a powder or as an aqueous dispersion. If desired, a surface-active agent may also be present. To this reaction mixture, abrasives of desired types and grain sizes are added. During the reaction, larger or smaller quantities of an inert gas such as air are added to the reaction mixture, by agitation, for example. The foam thus produced is poured into molds and allowed to coagulate at temperatures ranging from about 20° to 100° C. Within about 2 to 120 hours, the reaction mixture sets with the shape given to it; any shape may be given ot the foam material. In a preferred embodiment, the foamed material is poured into cylindrical molds to form cylindrical shaped bodies which are then cut into discs. The shaped bodies are washed and dried at temperatures ranging from about 30 to 70° C. A further hardening of the material can be achieved by a prolonged heating, advantageously with the exclusion of air, to temperatures which range from about 120 to 170° C.

In the process according to the present invention, the abrasives are evenly distributed and bonded. The material obtained may be compressed under the influence of heat and thus further hardened, at the expense of its elasticity.

The shaped bodies of the present invention are distinguished by their high elasticity and grinding power and by their resistance to abrasion and breaking. They possess an open structure and can be used with excellent results for dry grinding or polishing and for profile grinding purposes. Even at higher grinding temperatures no clogging of the pores will occur.

The following examples are for the purpose of illustrating the present invention, without any intention of limiting the scope thereof.

*Example 1*

To 1780 g. of an aqueous solution containing 216 g. of polyvinyl alcohol are added 350 ml. of 30 percent by weight formalin, 560 g. of a 50 percent by weight aqueous polyvinyl acetate dispersion, 410 ml. of 16.8 percent by weight hydrochloric acid, and 3.6 kg. of corundum having a grain size which passes a sieve of 60 meshes per inch. The mass is intimately mixed and then foamed by beating air into it until the foam has attained a volume of 5.9 liters. In the course of the foaming-up operation, the polyvinyl acetate is saponified, and only 10–80 percent (depending on the time elapsed and the temperature) of the ester groups remain unchanged. At room temperature, the mixture is poured into molds and left standing for 2 to 6 days. Then the molded mass is taken out of the mold, washed with water, and dried.

*Example 2*

The procedure described in Example 1 is repeated, using a mixture of 294 g. of polyvinyl alcohol in 1800 g. of water, 425 ml. of 30 percent by weight formalin, 500 g. of a 46 percent by weight aqueous dispersion of polyvinyl propionate, 3.37 kg. of highly purified corundum, having a grain size which passes through a sieve of 220 meshes per inch, and 225 ml. of 54 percent by weight sulfuric acid. Before the foam was poured into the molds, it had a volume of 5 liters. After setting, the foamed body was washed and dried as in the preceding example.

*Example 3*

A mixture consisting of 47.5 g. of polyvinyl alcohol and 47.5 g. of a polyvinyl alcohol having 4 percent of butyral groups, is added to 500 ml. of water and foamed, after addition of 90 ml. of 30 percent by weight formaldehyde solution, 30 ml. of 30 percent by weight glyoxal solution, 130 ml. of 22 percent by weight hydrochloric acid, 219 g. of a 40 percent by weight aqueous dispersion of a styrene-butadiene copolymer, and 1.72 kg. of silicon carbide of a grain size passing an 80 meshes sieve until a foam volume of 3 liters is obtained. After setting, the obtained foamed body is washed and dried as in Example 1.

*Example 4*

1020 g. of a 15.2 percent by weight solution of polyvinyl alcohol are mixed with 210 ml. of 30 percent by weight formalin, 2.8 kg. of glass powder of a grain size passing a 100 mesh sieve, 112 ml. of concentrated hydrochloric acid, 415 g. of a 50 percent by weight aqueous polyvinyl acetate dispersion and 41.5 g. of a 66 percent by weight aqueous polyvinyl propionate dispersion, and foamed until 5 liters of foam are obtained; the foam is then poured into molds and allowed to set, washed and dried as in Example 1.

*Example 5*

1770 g. of a 14.8 percent by weight aqueous solution of medium molecular weight polyvinyl alcohol are mixed with 405 ml. of 30 percent by weight formaldehyde solution, 225 ml. of 42 percent by weight sulfuric acid, 0.2 g. of phenyl sulfonate or another wetting agent, 180 g. of a 50 percent by weight aqueous polyvinyl chloride dispersion, 180 g. of a 40 percent by weight aqueous polyvinyl ether dispersion, 1.3 kg. of corundum of a grain size passing a 240 mesh sieve and 1.2 kg. of pumic powder and foamed until a volume of 4.9 liters is reached; molding, setting, washing and drying are performed as in Example 1.

*Example 6*

A mixture consisting of 106 g. of polyvinyl alcohol, 106 g. of water-soluble modified polyvinyl alcohol (graft polymer), a suitable amount of water (e.g., 1270 g.), 220 ml. of 30 percent by weight formaldehyde solution, 300 g. of an aqueous polymethacrylate dispersion, 170 ml. of 25 percent by weight hydrochloric acid, and 1.35 kg. of corundum, having a grain size which passes a 60 mesh sieve, is foamed until it has a volume of 3.1 liters. The foamed mass is poured into molds and left standing for 3 days.

*Example 7*

169 g. of polyvinyl alcohol are added to 920 ml. of water and mixed with 340 mol of 30 percent by weight formaldehyde solution, 200 ml. of 22 percent by weight phosphoric acid, 0.2 g. of phenyl sulfonate or another wetting agent, 250 g. of an aqueous 50 percent by weight polyvinylidene chloride dispersion and 1.7 kg. of emery powder. The mixture is foamed to give a volume of 5 liters then poured into a mold, where it is allowed to set, and then washed and dried.

*Example 8*

125 g. of a polyvinyl alcohol which is cyanoethylated to 30 percent of its initial hydroxyl group content, are dissolved in 750 ml. of water and then intimately mixed with 139 ml. of a 30 percent formaldehyde solution, 27 g. of a 50 percent by weight aqueous butadiene-acrylonitrile dispersion, 108 ml. of 22 percent by weight hydrochloric acid, 625 g. of silicon carbide of a grain size passing a sieve of 180 meshes per inch and 50 g. of pumice powder. The mixture is foamed to give a volume of 2 liters, poured into molds and then left standing at 65° C. After one day, a solidified sponge-like mass has resulted which can be cut to very dense polishing discs.

*Example 9*

750 ml. water, 125 g. of polyvinyl alcohol, 142 ml. of a 30 percent formaldehyde solution, 100 g. of a 50 percent by weight aqueous butadiene-styrene dispersion, 42 g. of a 50 percent by weight styrene dispersion, 142 ml. of 50 percent by weight sulfuric acid, 1.3 kg. of corundum, of a grain size which passes a sieve having 60 meshes per inch, and 0.3 kg. of fine pumice powder are intimately mixed. The mixture is foamed to give a volume of 3 liters. After the foamed mass has been poured into molds and left standing for 4 days, a product is obtained which is very hard and, if used in the form of polishing discs, proves to be very effective for polishing purposes.

*Example 10*

A polishing body produced in accordance with Example 1 is, in a dry state, heated briefly to 160–170° C. and then pressed in a mold in such a way that the original volume is reduced by 40 percent. The compressed bodies obtained are very hard and are suitable for grinding steel, aluminum, brass, grey pig iron, plastics, and lacquered surfaces.

This application is a continuation-in-part of co-pending application Serial No. 11,950, filed March 1, 1960, and now abandoned.

It will be obvious to those skilled in the art that many modifications may be made within the scope of the present invention without departing from the spirit thereof, and the invention includes all such modifications.

What is claimed is:

1. A process for making a porous abrasive article which comprises foaming an aqueous reaction mixture comprising polyvinyl alcohol, formaldehyde, an acid catalyst, a finely divided thermoplastic material, and an abrasive present in an effective amount of at least three times as much abrasive, by weight, as the total weight of polyvinyl alcohol and finely-divided thermoplastic material, setting the resulting foam in a mold, and washing and drying the molded porous article.

2. A process according to claim 1 in which the ratio of polyvinyl alcohol to finely divided thermoplastic material is in the range of about 0.9 to 1 to about 8 to 1 by weight.

3. A process according to claim 1 in which the particle size of the finely divided thermoplastic material is in the range of about $0.01\mu$ to about $10\mu$.

4. A porous abrasive article comprising a binder of polyvinyl formal and a dispersed thermoplastic material, and an abrasive, the latter being present in an effective amount of at least three times as much, by weight, as the total weight of binder.

References Cited in the file of this patent

UNITED STATES PATENTS

| | | |
|---|---|---|
| 2,532,241 | Ott | Nov. 28, 1950 |
| 2,636,013 | Wilson | Apr. 21, 1953 |
| 2,876,085 | Horie | Mar. 3, 1959 |
| 3,061,460 | Schickedanz | Oct. 30, 1962 |